United States Patent
Chau et al.

(10) Patent No.: US 9,695,059 B2
(45) Date of Patent: Jul. 4, 2017

(54) PROCESS FOR PREPARING SODIUM BICARBONATE PARTICLES

(71) Applicant: SOLVAY SA, Brussels (BE)

(72) Inventors: Thoi-Dai Chau, Bad Hoenningen (DE); David Jean Lucien Savary, Dombasle-sur-Meurthe (FR)

(73) Assignee: Solvay SA, Brussels (BE)

( * ) Notice: Subject to any disclaimer, the term of this patent is extended or adjusted under 35 U.S.C. 154(b) by 0 days.

(21) Appl. No.: 14/365,121

(22) PCT Filed: Dec. 19, 2012

(86) PCT No.: PCT/EP2012/076065
§ 371 (c)(1),
(2) Date: Jun. 13, 2014

(87) PCT Pub. No.: WO2013/092650
PCT Pub. Date: Jun. 27, 2013

(65) Prior Publication Data
US 2014/0348738 A1  Nov. 27, 2014

(30) Foreign Application Priority Data

Dec. 21, 2011 (EP) .................................... 11194784

(51) Int. Cl.
*C01D 7/10*  (2006.01)
*C01D 7/12*  (2006.01)

(52) U.S. Cl.
CPC ............... *C01D 7/10* (2013.01); *C01D 7/12* (2013.01); *C01D 7/123* (2013.01); *C01D 7/126* (2013.01);
(Continued)

(58) Field of Classification Search
CPC ................................. C01D 7/10; C01D 7/12
(Continued)

(56) References Cited

U.S. PATENT DOCUMENTS 3,647,365 A   3/1972 Saeman
3,780,160 A   12/1973 Waggener et al.
(Continued)

FOREIGN PATENT DOCUMENTS

JP    S 48-017160 B1   5/1973
JP    H 05-339005 A1   12/1993
(Continued)

OTHER PUBLICATIONS

English machine translation of WO1999038800.*

*Primary Examiner* — Richard M Rump
(74) *Attorney, Agent, or Firm* — Beatrice C. Ortego

(57) ABSTRACT

A process for preparing sodium bicarbonate particles, comprising the steps of: (a) adding at least one alkali metal carbonate to an aqueous solution in order to form an aqueous composition; wherein the alkali metal carbonate comprises sodium carbonate and wherein the aqueous composition comprises at least one polycarboxylic acid and/or the salts thereof, in an amount of at least 200 ppm based on the weight of the aqueous composition; and (b) precipitating solid particles comprising sodium bicarbonate crystals and separating said sodium bicarbonate particles from the aqueous composition, in order to obtain sodium bicarbonate particles and an aqueous mother liquor.

22 Claims, 1 Drawing Sheet

(52) U.S. Cl.
CPC ...... *C01P 2004/61* (2013.01); *C01P 2006/12* (2013.01); *C01P 2006/13* (2013.01)

(58) Field of Classification Search
USPC .............................. 423/184, 422, 265, 421
See application file for complete search history.

(56) References Cited

U.S. PATENT DOCUMENTS

| | | |
|---|---|---|
| 3,855,397 A | 12/1974 | Hoffman et al. |
| 3,868,444 A | 2/1975 | Frevel et al. |
| 3,870,784 A | 3/1975 | Saeman |
| 4,478,599 A | 10/1984 | Puri et al. |
| 5,290,322 A | 3/1994 | Breton et al. |
| 5,445,805 A | 8/1995 | Zuccarello et al. |
| 5,482,701 A | 1/1996 | Winston |
| 5,645,840 A | 7/1997 | Lajoie et al. |
| 2013/0095011 A1* | 4/2013 | Breton et al. ................. 423/184 |

FOREIGN PATENT DOCUMENTS

| | | | | |
|---|---|---|---|---|
| NL | WO 9803461 A1 * | 1/1998 | ............ | C07C 67/48 |
| SU | 208699 | 1/1968 | | |
| SU | 409960 A | 4/1974 | | |
| WO | WO 9424996 A1 * | 11/1994 | ........... | A61K 8/0229 |
| WO | WO9938800 A1 * | 5/1999 | ............. | B01D 53/00 |
| WO | WO 01/14254 A1 | 3/2001 | | |
| WO | WO 2009/138403 A1 | 11/2009 | | |
| WO | WO 2011/161120 A1 | 12/2011 | | |
| WO | WO 2013/092754 A1 | 6/2013 | | |

\* cited by examiner

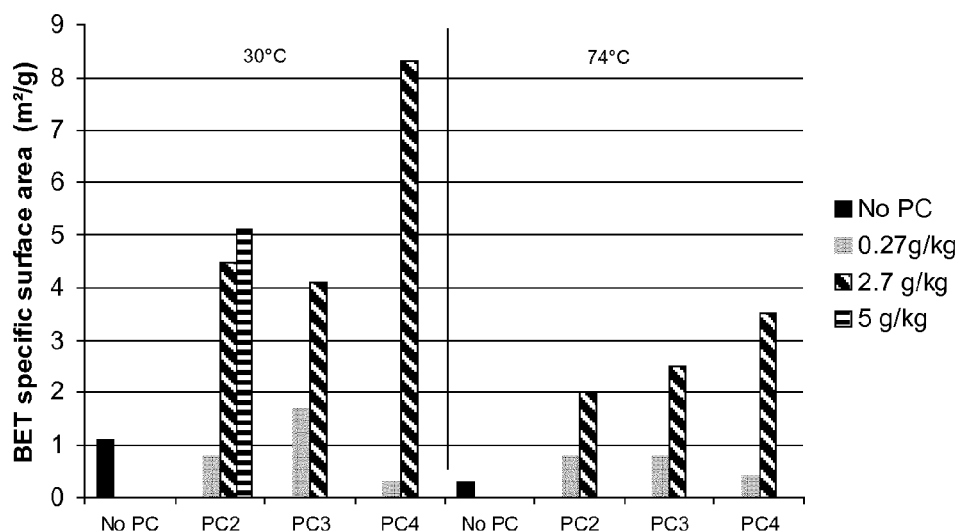

PROCESS FOR PREPARING SODIUM BICARBONATE PARTICLES

CROSS-REFERENCE TO RELATED APPLICATIONS

This application is a U.S. national stage entry under 35 U.S.C. §371 of International Application No. PCT/EP2012/076065 filed Dec. 19, 2012, which claims priority to European application No. 11194784.2 filed Dec. 21, 2011, the whole content of this application being incorporated herein by reference for all purposes.

FIELD OF THE INVENTION

The invention relates to a process for preparing sodium bicarbonate particles, and to the particles obtained therewith.

BACKGROUND OF THE INVENTION

Sodium bicarbonate ($NaHCO_3$) is a product with a wide range of interesting properties and a very wide range of applications from high tech ingredients for the pharmaceutical industry to the human food and animal feed industry.

Sodium bicarbonate can be produced by the carbonation of sodium carbonate. In Europe, the carbonation is usually performed in situ in the soda ash plants from $CO_2$ coproduced during the production of soda ash (mainly the $CO_2$ generation in the lime kilns). In the USA, the carbonation is usually performed in separate plants which purchase independently the soda ash and the $CO_2$ and combine them.

Sodium bicarbonate wet cake is traditionally dried by using conventional rotary steam tube dryers. Such methods involve high temperature dehydration and steam pressure up to 35 atm. The dried material usually has high bulk density and the crystals resulting from this process usually have irregular particle size distribution and dendritic structures, which are physically weak and readily disintegrate into finer fragments on handling. Furthermore, at higher temperatures, sodium bicarbonate tends to be converted into sodium carbonate.

It is an object of the invention to provide sodium bicarbonate particles with a high specific surface area. It is also an object of the invention to provide a process for preparing sodium carbonate particles with a high specific surface.

SUMMARY OF THE INVENTION

The present inventors have now surprisingly found that one or more of these objects can be obtained by specific choices for an additive during the preparation process. The present inventors have discovered that large sized sodium bicarbonate particles having a relatively high specific surface area and/or desired particle shape can be obtained from an aqueous composition comprising alkali metal carbonate and at least one polycarboxylic acid and/or the salts thereof, under selected conditions of concentration.

According to a first aspect, the present invention provides a process for preparing sodium bicarbonate particles. Said process comprises the steps of:
(a) adding at least one alkali metal carbonate to an aqueous solution in order to form an aqueous composition; wherein the alkali metal carbonate comprises sodium carbonate and wherein the aqueous composition comprises at least one polycarboxylic acid and/or the salts thereof, in an amount of at least 200 ppm based on the weight of the aqueous composition; and
(b) separating sodium bicarbonate starting from the aqueous composition, in order to obtain sodium bicarbonate particles, on one hand, and an aqueous mother liquor, on the other hand.

Preferably, step (b) comprises the step of contacting the aqueous composition with a gas comprising carbon dioxide.

Sodium bicarbonates particles having high specific surface area can be obtained using a relatively high dosage of polycarboxylic acid and/or salt thereof.

According to a second aspect, the present invention encompasses sodium bicarbonate particle having an average equivalent spherical diameter D50 of at least 10 μm, a D90 of at least 60 μm, as measured by laser light scattering, and an average BET specific surface area of at least 4.0 $m^2/g$.

According to a third aspect, the present invention encompasses sodium carbonate particles, having an average equivalent spherical diameter D50 of at least 10 μm, a D90 of at least 60 μm, as measured by laser light scattering, and an average BET specific surface area of at least 10 $m^2/g$, preferably at least 15 $m^2/g$.

The independent and dependent claims set out particular and preferred features of the invention. Features from the dependent claims may be combined with features from the independent or other dependent claims as appropriate.

The above and other characteristics, features and advantages of the present invention will become apparent from the following detailed description, which illustrates, by way of example, the principles of the invention.

BRIEF DESCRIPTION OF THE FIGURES

FIG. 1 represents a graph plotting the BET specific surface area (in $m^2/g$) of sodium bicarbonate particles, prepared without or in the presence of different polycarboxylic acids at different concentrations.

DETAILED DESCRIPTION OF THE INVENTION

Before the present formulations of the invention are described, it is to be understood that this invention is not limited to particular formulations described, since such formulations may, of course, vary. It is also to be understood that the terminology used herein is not intended to be limiting, since the scope of the present invention will be limited only by the appended claims.

As used herein, the singular forms "a", "an", and "the" include both singular and plural referents unless the context clearly dictates otherwise. By way of example, "an additive" means one additive or more than one additives.

The terms "comprising", "comprises" and "comprised of" as used herein are synonymous with "including", "includes" or "containing", "contains", and are inclusive or open-ended and do not exclude additional, non-recited members, elements or method steps. It will be appreciated that the terms "comprising", "comprises" and "comprised of" as used herein comprise the terms "consisting of", "consists" and "consists of".

Throughout this application, the term "about" is used to indicate that a value includes the standard deviation of error for the device or method being employed to determine the value.

As used herein, the term "average" refers to number average unless indicated otherwise.

As used herein, the terms "% by weight", "wt %", "weight percentage", or "percentage by weight" are used interchangeably.

The recitation of numerical ranges by endpoints includes all integer numbers and, where appropriate, fractions subsumed within that range (e.g. 1 to 5 can include 1, 2, 3, 4 when referring to, for example, a number of elements, and can also include 1.5, 2, 2.75 and 3.80, when referring to, for example, measurements). The recitation of end points also includes the end point values themselves (e.g. from 1.0 to 5.0 includes both 1.0 and 5.0). Any numerical range recited herein is intended to include all sub-ranges subsumed therein.

All references cited in the present specification are hereby incorporated by reference in their entirety. In particular, the teachings of all references herein specifically referred to are incorporated by reference.

Unless otherwise defined, all terms used in disclosing the invention, including technical and scientific terms, have the meaning as commonly understood by one of ordinary skill in the art to which this invention belongs. By means of further guidance, term definitions are included to better appreciate the teaching of the present invention.

In the following passages, different aspects of the invention are defined in more detail. Each aspect so defined may be combined with any other aspect or aspects unless clearly indicated to the contrary. In particular, any feature indicated as being preferred or advantageous may be combined with any other feature or features indicated as being preferred or advantageous.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to a person skilled in the art from this disclosure, in one or more embodiments. Furthermore, while some embodiments described herein include some but not other features included in other embodiments, combinations of features of different embodiments are meant to be within the scope of the invention, and form different embodiments, as would be understood by those in the art. For example, in the appended claims, any of the claimed embodiments can be used in any combination.

According to a first aspect, the present invention provides a process for preparing sodium bicarbonate particles comprising the steps of:
(a) adding at least one alkali metal carbonate to an aqueous solution in order to form an aqueous composition; wherein the alkali metal carbonate comprises sodium carbonate and wherein the aqueous composition comprises at least one polycarboxylic acid and/or the salts thereof, in an amount of at least 200 ppm based on the weight of the aqueous composition; and
(b) separating sodium bicarbonate starting from the aqueous composition, in order to obtain sodium bicarbonate particles, on one hand, and an aqueous mother liquor, on the other hand.

The first stage of the process according to the invention comprises adding at least one alkali metal carbonate comprising sodium carbonate to an aqueous solution thereby forming an aqueous composition.

As used herein, the term "alkali metal carbonate" refers to any compound comprising the carbonate —$CO_3^{2-}$ group and an alkali metal. Preferably, the alkali metal is sodium.

The alkali metal carbonate used in the process can be commercially available sodium carbonate. Non-limiting examples of a suitable source for the sodium metal carbonate can be a mineral comprising sodium carbonate, such as trona, nahcolite, Wegscheiderite or Decemite. Trona is a mineral that can contain about 90-95% sodium sesquicarbonate ($Na_2CO_3 \cdot NaHCO_3 \cdot 2H_2O$).

In an embodiment, the alkali metal carbonate comprises a sesquicarbonate, preferably sodium sesquicarbonate. Preferably, the alkali metal carbonate comprises sodium sesquicarbonate dihydrate ($Na_2CO_3 \cdot NaHCO_3 \cdot 2H_2O$). The sesquicarbonate can have different origins. It can be produced artificially out of different sodium sources. However, it is particularly interesting that sesquicarbonate derives from a natural trona ore. Suitable sodium sesquicarbonate can have a mean particle diameter comprised between 0.1 and 10 mm. The mean diameter is the D50, which is the diameter such that half of the particles, in weight, have a diameter lower than the specified value. For non spherical particles, the diameter is the equivalent spherical one.

In some embodiments, the alkali metal carbonate is calcined alkali metal carbonate, for example calcined sesquicarbonate. In this embodiment, alkali metal carbonate is first calcined, preferably at a temperature comprised between 100° C. and 4000° C., before its addition to the aqueous solution.

Preferably, the alkali metal carbonate is sodium carbonate and the aqueous solution also comprises sodium bicarbonate. In an embodiment, the aqueous solution can further comprise sodium chloride.

In an embodiment, the aqueous composition of step (a) comprises sodium carbonate and sodium bicarbonate. Preferably, the weight ratio of sodium carbonate to sodium bicarbonate is higher than 1.0, preferably higher than 2.0, preferably higher than 3.0, preferably higher than 5.0.

The aqueous composition of step (a) can have a pH of at least 8.

In some embodiments, at least 100 g of alkali metal carbonate per kg of aqueous solution is added to the aqueous solution; preferably at least 150 g of alkali metal carbonate per kg of aqueous composition, preferably at least 200 g of alkali metal carbonate per kg of aqueous composition.

According to the invention, the aqueous composition comprises at least 200 ppm of at least one polycarboxylic acid and/or salts thereof, with ppm being based on the total weight of the aqueous composition. The aqueous composition can comprise at least 300 ppm of polycarboxylic acid and/or salts thereof, for example at least 400 ppm, for example at least 500 ppm, for example at least 600 ppm, preferably at least 1000 ppm, preferably at least 2000 ppm of polycarboxylic acid and/or the salts thereof, preferably at least 2500 ppm, preferably at least 2700 ppm of polycarboxylic acid and/or the salts thereof, with ppm being based on the weight of the aqueous composition. As used herein, the term "ppm" refers to weight parts per million. For example, the aqueous composition can comprise at least 1 g of polycarboxylic acid and/or the salts thereof per 1 kg of aqueous composition, preferably at least 1.5 g, more preferably at least 2 g/kg, yet more preferably at least 2.5 g/kg, for examples at least 2.7 g/kg, and for example at most 5 g of polycarboxylic acid and/or the salts thereof per 1 kg of aqueous composition.

As used herein, the term "polycarboxylic acid or salt thereof" refers to acids or salts thereof comprising two or more carboxylate —$COO^-$ groups. In a preferred embodiment, the polycarboxylic acid or salts thereof is in the form of an acid or a sodium salt. In an embodiment, the polycarboxylic acid or salt thereof is an acid. In an embodiment, the polycarboxylic acid or salt thereof is a sodium salt.

The polycarboxylic acid and/or salts thereof can be selected from the group comprising sodium polyacrylate; copolymers of acrylic acid and maleic acid; polyacrylic acid, and mixtures or blends thereof; preferably wherein the polycarboxylic acid and/or salts thereof is sodium polyacrylate or a copolymer of acrylic acid and maleic acid, preferably wherein the polycarboxylic acid and/or salts thereof is a copolymer of acrylic acid and maleic acid.

As used herein, the term "sodium polyacrylate" refers to polymers comprising the general formula (I) below, wherein n is at least 2:

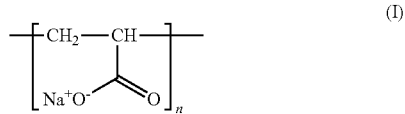

(I)

As used herein, the term "polyacrylic acid" refers to polymers comprising the general formula (II) below, wherein n is sat least 2:

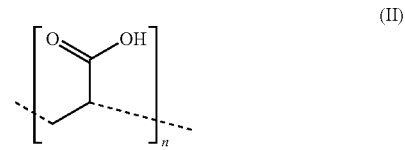

(II)

In an embodiment, the polycarboxylic acid is a copolymer of acrylic acid and maleic acid.

As used herein, the term "copolymer of acrylic acid and maleic acid" refers to polymers comprising the general formula (III) below, wherein x and y are at least 2:

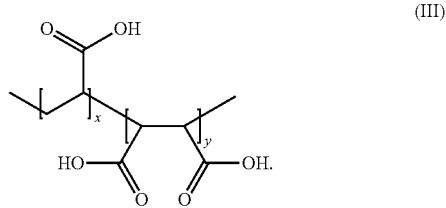

(III)

In an embodiment, the polycarboxylic acid or salts thereof has an average molar mass ranging from 1 to 200 kg/mol, preferably from 5 to 100 kg/mol, preferably from 10 to 90 kg/mol, preferably from 20 to 80 kg/mol, preferably from 30 to 70 kg/mol.

The process according to the invention can be operated either in a batch/discontinuous mode or in a continuous mode.

The process can be performed at a temperature of at most 70° C., for example at a temperature of at most 60° C., for example at a temperature of at most 50° C., preferably at a temperature of at most 40° C., and more preferably at a temperature of at most 30° C.

The next step comprises separating sodium bicarbonate starting from the aqueous composition, in order to obtain sodium bicarbonate particles, on one hand, and an aqueous mother liquor, on the other hand.

In advantageous embodiments, the process comprises injecting a gas comprising $CO_2$ into the aqueous composition, in order to carbonate it and produce sodium bicarbonate.

In an embodiment the gas comprises at least 20% in weight, advantageously 40%, preferably 60%, more preferably 80% $CO_2$. Preferably, the gas is pure (100%) $CO_2$.

The reaction can be performed in a stirred gas liquid reactor, preferably comprising a gas injector able to distribute the gas homogeneously into the reactor. The liquid constitutes advantageously the continuous phase inside the reactor, the gas being injected at the bottom and moving upwards. The reactor can comprises cooling means to maintain the process at the desired temperature. The $CO_2$ can have different origins. In one embodiment, the $CO_2$ can be obtained from a natural gas plant, for example after having been concentrated for example through an amine process. In another embodiment, the $CO_2$ can be from a soda ash plant.

In an embodiment, the aqueous solution can be seeded by adding nucleating agents. For example, substantially crystalline sodium bicarbonate can be added as nucleating agent.

The separation of the particles from the suspension can be carried out by any appropriate mechanical separating means, for example by settling, by centrifugation, by filtration or by a combination of these separating means. The separation can be done on any appropriate equipment. Without being limitative, the equipment can be chosen among: decanters, rotative filters, band filters, centrifuges and their combinations. The sodium bicarbonate particles may be washed with fresh water to remove part of the production solution containing sodium carbonate. The drying of the particles can be realized on any appropriate equipment. Advantageously the drying is operated in a fluid bed, a rotary dryer, a flash pneumatic conveyor dryer, or a gravity dryer. The final temperature of the particles exiting the dryer should be low enough to avoid thermal decomposition of sodium bicarbonate into sodium carbonate. In an advantageous mode, the drying of the solid particles is operated with a $CO_2$ enriched atmosphere. This enables to transform part of the dissolved sodium carbonate, present in production solution and impregnating the solid particles, into sodium bicarbonate.

The process according to the invention allows to directly produce fairly pure sodium bicarbonate crystals out of the aqueous composition having a high specific surface area, and/or a high average particle size.

The sodium bicarbonate crystals produced by the process according to the invention are of high purity, and have a very special structure with a high specific area, and a unique granulometry. Moreover, they are extremely advantageous for many applications, in which cost is a major aspect.

As used herein, the term "particles" refers to crystallites or primary particles and clusters of primary particles. Crystallites or primary particles are defined as the smallest discrete particles that can be seen by Electron Microscopy analysis.

In some embodiments, the sodium bicarbonate particles produced have an average equivalent spherical diameter D50 of at least 10 μm, as measured by laser light scattering.

As used herein, the term "equivalent spherical diameter" refers to the diameter of a sphere having the same equivalent volume as the particle. As used herein, particle average size may be expressed as "Dxx" where the "xx" is the volume percent of that particle having a size equal to or less than the Dxx. The D90 is defined as the particle size for which ninety percent by volume of the particles has a size lower than the D90. The D50 is defined as the particle size for which fifty percent by volume of the particles has a size lower than the D50. The D10 is defined as the particle size for which fifty percent by volume of the particles has a size lower than the D10. The D10, D50 and D90 can be measured by laser diffraction analysis, for example on a Malvern type analyzer. Suitable Malvern systems include the Malvern MasterSizer S, Malvern 2000, Malvern 2600 and Malvern 3600 series.

In some embodiments, the sodium bicarbonate particles produced have an average equivalent spherical diameter D90 of at least 60 nm, as measured by laser light scattering.

In some embodiment, the sodium bicarbonate particles produced have an average BET specific surface area of at least 1.0 m$^2$/g. In preferred embodiments, the average BET specific surface area is at least 2.0 m$^2$/g, preferably at least 3.0 m$^2$/g, preferably at least 4.0 m$^2$/g, preferably at least 6.0 m$^2$/g.

The sodium bicarbonate particles produced by the process of the invention are substantially crystalline. As used herein, the term "substantially crystalline" is understood to mean that more than 50% by weight, especially more than 75% by weight, more particularly more than 90% by weight of the particles are in the form of crystalline material when analyzed by an X-ray diffraction technique.

The present invention also encompasses sodium bicarbonate particles obtained by the process according to the invention. For example, the invention encompasses sodium bicarbonate particles obtained by the process according to the invention, said particles having an average equivalent spherical diameter D50 of at least 10 nm, a D90 of at least 60 nm, as measured by laser light scattering, and an average BET specific surface area of at least 4.0 m$^2$/g.

The present invention also encompasses sodium bicarbonate particles having an average equivalent spherical diameter D50 of at least 10 nm, a D90 of at least 60 nm, as measured by laser light scattering, and an average BET specific surface area of at least 4.0 m$^2$/g.

In preferred embodiments, the average BET specific surface area is at least 4.0 m$^2$/g, preferably at least 5.0 m$^2$/g, preferably at least 6.0 m$^2$/g. In an embodiment, the average BET specific surface area ranges from 2.0 m$^2$/g to 10.0 m$^2$/g, preferably from 3.0 m$^2$/g to 10.0 m$^2$/g, preferably from 4.0 m$^2$/g to 10.0 m$^2$/g, in some instances preferably from 6.0 m$^2$/g to 10.0 m$^2$/g, even from 8.0 m$^2$/g to 10.0 m$^2$/g.

Preferably, more than 50% by weight, especially more than 75% by weight, more particularly more than 90% by weight of the particles are in the form of crystalline material when analyzed by an X-ray diffraction technique.

In a preferred embodiment, the particles comprise at least 80.0% by weight of sodium bicarbonate, preferably at least 90% by weight of sodium bicarbonate, preferably at least 95% by weight of sodium bicarbonate, preferably at least 98% by weight of sodium bicarbonate, preferably at least 99% by weight of sodium bicarbonate, preferably at least 99.9% by weight of sodium bicarbonate, based on the total weight of the particles.

The present invention also encompasses a process for preparing sodium carbonate particles, comprising the step of converting the sodium bicarbonate particles obtained by the process according to the first aspect of the invention to sodium carbonate by calcination at a temperature of at least 80° C., wherein the sodium carbonate particles have an average BET specific surface area of at least 10 m$^2$/g, preferably at least 15 m$^2$/g.

These sodium carbonate particles are advantageously prepared by calcining the sodium bicarbonate particles according to the second aspect of the invention.

This additional calcining step can be performed at a temperature of at least 80, preferably at least 100° C., for example at least 200° C., preferably at least 220° C., preferably at least 240° C. This calcining step can last for at least 1 hour.

The present invention also encompasses sodium carbonate particles obtained by the process described herein. For example, the invention encompasses sodium carbonate particles obtained by the process of calcination, said particles having an average equivalent spherical diameter D50 of at least 10 μm, a D90 of at least 60 μm, as measured by laser light scattering, and an average BET specific surface area of at least 10 m$^2$/g, preferably at least 15 m$^2$/g.

The present invention also encompasses sodium carbonate particles, having an average equivalent spherical diameter D50 of at least 10 μm, a D90 of at least 60 μm, as measured by laser light scattering, and an average BET specific surface area of at least 10 m$^2$/g, preferably at least 15 m$^2$/g.

In preferred embodiments, the average equivalent spherical diameter D50 of the sodium carbonate particles according to the invention can be at least 20 μm, preferably at least 30 μm, preferably at least 40 μm, preferably at least 60 μm, preferably at least 80 μm. In an embodiment, the average equivalent spherical diameter D90 is at least 60 μm, preferably at least 100 μm, preferably at least 150 μm, preferably at least 200 μm.

The carbonates and bicarbonates particles of the invention have particularly high BET specific surface area and good storage stability.

Should the disclosure of any patents, patent applications, and publications which are incorporated herein by reference conflict with the description of the present application to the extent that it may render a term unclear, the present description shall take precedence.

The invention is illustrated but not limited by the following examples.

EXAMPLES

Test Methods

Granulometry (D10, D50 and D90) was measured by a solid state laser, on a Malvern MasterSizer S.

Specific surface area was measured by laser light scattering using the nitrogen adsorption isotherm and the BET model (Brunauer, Emmett and Teller). Measurements were carried out with a Micromeritics Gemini 2360 Surface Area Analyzer.

Ingredients

Polycarboxylate 2 (PC2): sodium polyacrylate (NaPA) with a molecular weight of 40 000-60 000 g/mol and 40% active material. PC2 is commercially available as Maredis 146 from BASF.

Polycarboxylate 3 (PC3): polyacrylic acid with a molecular weight of 100 000 g/mol and 35% active material. PC3 is commercially available as Sokalan PA 80S from BASF.

Polycarboxylate 4 (PC4): sodium salt of copolymer of acrylic acid and maleic acid with a molecular weight of 70 000 g/mol and 40% active material. PC4 is commercially available as Sokalan PC 5 from BASF.

Polycarboxylate 5 (PC5): copolymer of acrylic acid and maleic acid with a molecular weight of 3 000 g/mol and 50% active material. PC5 is commercially available from Sigma-Aldrich.

Commercially available sodium chloride (NaCl) from ESCO Dombasle (FR), sodium carbonate ($Na_2CO_3$) and sodium bicarbonate ($NaHCO_3$) from Solvay Plant in Dombasle were used.

Example 1

A thermally conditioned double walled reactor, containing a starting solution rich in carbonate was maintained at a temperature of 30° C. The starting solution contained $[Na_2CO_3]=208$ g/kg; and $[NaHCO_3]=29$ g/kg. The production process was performed with or without polycarboxylate. Gaseous $CO_2$ (100%) was injected at 800 l/hr for 2 hours. After 2 hours during which solid particles containing crystals of sodium bicarbonate were precipitated, the content of the reactor was filtered in order to separate the solid particles from the mother liquor, and air dried. The same experiment was repeated at 74° C., with a starting solution containing $[Na_2CO_3]=208$ g/kg; and $[NaHCO_3]=57$ g/kg.

0.27 g of PC2, PC3 or PC4 polycarboxylate per kg of water solution were tested. The same experiment was repeated without polycarboxylate (no PC), and with either 2.7 g or 5 g of PC2, PC3 or PC4 polycarboxylate per kg of water.

The results are shown in FIG. 1. The results showed that performing the production process in the presence of polycarboxylate, allowed the production of particles having larger specific surface areas. The results also showed that increasing the concentrations in polycarboxylic acid and/or salt thereof can increase sodium bicarbonate particle surface area. The results also showed that working below 70° C. can further increased sodium bicarbonate particle' surface area.

Example 2

A thermally conditioned double walled reactor, containing a starting solution rich in carbonate was maintained at a temperature of 30° C. The starting solution contained $[Na_2CO_3]=208$ g/kg; and $[NaHCO_3]=29$ g/kg and $[NaCl]=0.7$ g/kg. The production process was performed with 2.7 g of PC5 polycarboxylate per kg of water solution or without polycarboxylate. Gaseous $CO_2$ (100%) was injected at 800 l/hr for 2 hours. After 2 hours during which solid particles containing crystals of sodium bicarbonate were precipitated, the content of the reactor was filtered in order to separate the solid particles from the mother liquor, and air dried.

The sodium bicarbonate particles were further calcined in an oven at 205° C. during 3 hours followed by 1 hour of degasifying a 250° C., thereby obtaining sodium carbonate. The BET specific surface area of the particles was then measured after the production, and compared to commercially available bicarbonate particles. The storage stability of the particles was evaluated and the BET specific surface area of the particles was measured again after 1 month. The results are shown in Table 1.

TABLE 1

| | BET area (m²/g) | |
|---|---|---|
| Samples | Sodium bicarbonate particles | Sodium carbonate particles (Obtained after calcination of the bicarbonate particles) |
| prepared without PC5 | 0.1 | 4.5 |
| prepared with PC5 | 8.3 | 21.0-22.9 |
| prepared with PC5. Stability at 1 month of storage | 7.4-8.0 | 12.0 |
| Bicar ® 0/13 (commercially available sodium bicarbonate) | 0.1 | 4.2 |
| Bicar ® 13/50 (commercially available sodium bicarbonate) | <0.1 | 4.0 |
| Bicar ® 27/50 (commercially available sodium bicarbonate) | <0.1 | 4.7 |

The results showed that performing the production process in the presence of 2.7 g/kg of polycarboxylate, allowed the production of particles having high specific surface areas. The results also showed that after calcination of the bicarbonate particles obtained by the present process, sodium carbonate particles with very high BET area were obtained, and that the particles were particularly stable in time.

It is to be understood that although preferred embodiments have been discussed for providing embodiments according to the present invention, various modifications or changes may be made without departing from the scope and spirit of this invention.

The invention claimed is:

1. A process for preparing sodium bicarbonate particles, the process comprising the steps of:
   (a) adding at least one alkali metal carbonate to an aqueous solution in order to form an aqueous composition; wherein the alkali metal carbonate comprises sodium carbonate and wherein the aqueous composition comprises at least one polycarboxylic acid and/or salts thereof, in an amount of at least 2500 ppm based on the weight of the aqueous composition; and
   (b) precipitating solid particles comprising crystals of sodium bicarbonate in said aqueous composition of step (a) and separating said sodium bicarbonate particles from the aqueous composition, in order to obtain sodium bicarbonate particles and an aqueous mother liquor.

2. The process according to claim 1, wherein step (b) comprises contacting the aqueous composition with a gas comprising carbon dioxide.

3. The process according to claim 1, wherein the aqueous composition of step (a) comprises sodium carbonate and sodium bicarbonate, and wherein the weight ratio of sodium carbonate to sodium bicarbonate is higher than 1.0.

4. The process according to claim 1, wherein the at least one polycarboxylic acid and/or the salt thereof is selected from the group consisting of sodium polyacrylate, copolymers of acrylic acid and maleic acid, polyacrylic acid, and blends thereof.

5. The process according to claim 1, wherein the aqueous composition of step (a) has a pH of at least 8.

6. The process according to claim 1, wherein the process is performed at a temperature of at most 70° C.

7. The process according to claim 1, wherein the aqueous composition comprises at least 100 g of said alkali metal carbonate per kg of said aqueous composition.

8. The process according to claim 1, wherein the aqueous composition comprises from 0.2 g to 5.0 g of the polycarboxylic acid and/or salts thereof per kg of said aqueous composition.

9. The process according to claim 1, wherein the sodium bicarbonate particles have an average equivalent spherical diameter D50 of at least 10 μm, as measured by laser light scattering.

10. The process according to claim 1, wherein the sodium bicarbonate particles have an average equivalent spherical diameter D90 of at least 60 μm, as measured by laser light scattering.

11. The process according to claim 1, wherein the sodium bicarbonate particles have an average BET specific surface area of at least 2.0 m$^2$/g.

12. The process according to claim 1, wherein said sodium bicarbonate particles have an average equivalent spherical diameter D50 of at least 10 μm, a D90 of at least 60 μm, as measured by laser light scattering, and an average BET specific surface area of at least 1.0 m$^2$/g.

13. The process according to claim 1, wherein said at least one alkali metal carbonate added to said aqueous solution in step (a) comprises sodium sesquicarbonate.

14. The process according to claim 1, wherein said at least one polycarboxylic acid or salt thereof has an average molar mass ranging from 1 to 200 kg/mol.

15. The process according to claim 1, wherein said sodium bicarbonate particles prepared by said process have an average BET specific surface area of at least 4.0 m$^2$/g.

16. The process according to claim 1, wherein said sodium bicarbonate particles prepared by said process have an average BET specific surface area from 2.0 m$^2$/g to 10.0 m$^2$/g.

17. The process according to claim 1, wherein said sodium bicarbonate particles prepared by said process comprise at least 90% by weight of sodium bicarbonate.

18. A process for preparing sodium carbonate particles, comprising performing the process according to claim 1 to prepare sodium bicarbonate particles and further comprising the step of converting the sodium bicarbonate particles to sodium carbonate by calcination at a temperature of at least 80° C. to form sodium carbonate particles, wherein the sodium carbonate particles have an average BET specific surface area of at least 10 m$^2$/g.

19. Sodium bicarbonate particles, having an average equivalent spherical diameter D50 of at least 10 μm, a D90 of at least 60 μm, as measured by laser light scattering, and an average BET specific surface area of at least 4.0 m$^2$/g, wherein at least one polycarboxylic acid and/or salts thereof is used as an additive in an amount of at least 2500 ppm in an aqueous composition containing at least one alkali metal carbonate from which sodium bicarbonate is formed during its preparation process.

20. The sodium bicarbonate particles according to claim 19, wherein the average BET specific surface area is from 4.0 m$^2$/g to 10.0 m$^2$/g.

21. Sodium carbonate particles, having an average equivalent spherical diameter D50 of at least 10 μm, a D90 of at least 60 μm, as measured by laser light scattering, and an average BET specific surface area of at least 15 m$^2$/g.

22. The sodium carbonate particles according to claim 21, wherein at least one polycarboxylic acid and/or salts thereof is used as an additive during its preparation process.

* * * * *